UNITED STATES PATENT OFFICE.

GEORGE RICHARDSON, OF MILWAUKEE, WISCONSIN.

IMPROVEMENT IN HARDENING ARTIFICIAL STONE.

Specification forming part of Letters Patent No. 133,666, dated December 3, 1872.

*To all whom it may concern:*

Be it known that I, GEORGE RICHARDSON, of the city and county of Milwaukee, and State of Wisconsin, have invented an Improved Process of Hardening Artificial Stone; and I do hereby declare that the following is such a full, clear, and exact description thereof as will enable those skilled in the art to practice the same.

The nature of my invention consists in soaking the concrete or artificial stone, whether it be in the form of pipes, bricks, slabs, or of other configuration, in a bath of cold water, or in a solution of water and alum, or lime, or other alkaline substance, after it is taken out of the drying-chamber, where it may have been charged with carbonic-acid gas and the vapors of water, letting it remain in the cold-water bath for a considerable length of time, which will have the effect of solidifying and hardening the stone beyond any hardness obtainable by practicing the processes for this purpose now in common use.

In exercising this process any compound for forming artificial stone may be used, it being taken in its plastic state and molded into the desired form. In this state it is carried to a suitable kiln or drying-chamber, which is to be filled with carbonic acid or carbonic oxide and the vapors of water mingled together, maintained under a suitable pressure to cause them to permeate and saturate the concrete. For this purpose I prefer to employ the apparatus described in another application for Letters Patent, which I have filed in the Patent Office, in which the carbonic acid or carbonic oxide is reduced to the temperature at which it is found to be most effective by passing through a cooler in its passage from the generating-furnace to the drying-chamber or kiln. Any other apparatus for this purpose may, however, be employed in this part of the process. After the concrete has been fairly cured in this drying-chamber it is removed and placed in tanks containing cold water or a solution of water and any alkaline substance—such as lime, alum, or the like—and left to soak in this bath for a considerable length of time, say, from twelve hours to six days, the degree of hardness being commensurate with the length of time the stone is left soaking in the bath.

I do not claim the treatment of artificial stone with carbonic acid and vapor or water broadly, nor do I propose to claim now any novelty in the apparatus described in connection with my improved process.

What I claim as my invention, and desire to secure by Letters Patent, is—

The herein-described process of hardening artificial stone by soaking the same in a bath of cold water or an alkaline solution, after it has been cured with carbonic acid or carbonic oxide and the vapors of water, substantially as set forth.

In testimony whereof I have signed my name to this specification in the presence of two subscribing witnesses.

GEO. RICHARDSON.

Witnesses:
B. EDW. J. EILS,
A. RUPPERT.